United States Patent [19]

Kumar et al.

[11] 3,930,058

[45] Dec. 30, 1975

[54] MODIFIED VEGETABLE PROTEIN SIMULATING CASEIN

[76] Inventors: Surinder Kumar, 3 Villa Verde Drive, Apt. 103, Buffalo Grove, Ill. 60090; Kolar S. Ramachandran, 1465 Joan Drive, Palatine, Ill. 60067

[22] Filed: June 12, 1974

[21] Appl. No.: 478,757

[52] U.S. Cl. ........... 426/656; 260/112 G; 260/123.5
[51] Int. Cl.² ......................... A23J 3/00; A23J 3/02
[58] Field of Search ..... 260/112 G, 123.5; 426/364, 426/212

[56] References Cited
UNITED STATES PATENTS

| | | | |
|---|---|---|---|
| 3,440,054 | 4/1969 | Sair | 426/212 X |
| 3,653,912 | 4/1972 | Koski et al. | 426/212 X |
| 3,814,816 | 6/1974 | Gunther | 426/212 X |

*Primary Examiner*—James R. Hoffman

[57] ABSTRACT

A process is disclosed for producing a modified vegetable protein having thermoplastic and forming properties similar to casein and caseinate salts. The process comprises making an aqueous slurry of a vegetable protein material, adjusting the pH, heating the slurry, neutralizing the slurry, and then drying the neutralized slurry.

8 Claims, No Drawings

MODIFIED VEGETABLE PROTEIN SIMULATING CASEIN

BACKGROUND OF THE INVENTION

1. Field of the Invention

This invention relates to a process for producing a modified vegetable protein having thermoplastic and forming properties similar to casein and caseinate salts. The process involves the reaction of an alkali metal carbonate with a vegetable protein material.

2. Description of the Prior Art

Many attempts have been made to product modified vegetable protein having the properties of casein or caseinate salts. In recent years casein and caseinate salts such as sodium caseinate have become very expensive due to many economic factors. Casein and sodium caseinate, however, have some exceptional properties which have not been suitably duplicated heretofore by modified vegetable proteins. For instance, sodium caseinate has excellent binding and thermoplastic properties as well as having a good protein equivalency. The combination of protein content and thermoplastic forming and binding properties makes sodium caseinate and casein unique. This invention is the first known process for producing an acceptable modified vegetable protein which can be utilized as a substitute for casein and caseinate salts and which has high protein equivalency along with the thermoplastic and forming properties of casein and caseinate salts.

SUMMARY OF THE INVENTION

It is an object of this invention to provide a process for producing a modified vegetable protein having the thermoplastic and binding properties of casein and caseinate salts.

The objects of this invention are accomplished by a process for producing a modified vegetable protein having thermoplastic and forming properties similar to casein and caseinate salts, said process comprising:
A. making an aqueous slurry of a vegetable protein material, said vegetable protein material containing at least about 50 percent by weight protein;
B. adjusting the pH of the aqueous slurry to a pH of from about 7.0 to about 10.5 by addition thereto of an alkali metal carbonate;
C. heating the aqueous slurry to react the alkali metal carbonate with the protein;
D. neutralizing the slurry to a pH of from 6.6 to 7.0 by addition thereto of an edible acid; and
E. drying the neutralized slurry to remove a substantial portion of the water therein.

Preferably, the process includes a cooling step, say to a range of from room temperature to 130°F, after the heating-reacting and prior to neutralization.

More preferably the protein material of this invention is a solvent extracted oil seed vegetable protein.

Preferably also, the aqueous slurry of this invention has a solids content of about 3 percent to about 16 percent by weight, but depending upon protein in the solids should provide up to about 12 percent by protein in the slurry.

The preferred alkali metal carbonate of this invention is a member selected from the group comprising sodium carbonate, sodium bicarbonate, potassium carbonate, potassium bicarbonate.

The preferable reaction temperature of this invention is a temperature of from 280°F. to 370°F. in a closed vessel for 2½ to 5 minutes.

The first step in this invention requires making an aqueous slurry of a vegetable protein material with the vegetable protein material containing at least about 50 percent by weight protein. Preferably the protein material is an oil seed, solvent extracted, vegetable protein such as soy protein isolate or soy protein concentrate. Other proteins, however, such as oat protein, have been found to be highly acceptable for use in this invention. Other oil seed vegetable proteins, solvent extracted to concentrate the protein therein are also acceptable, such as peanut and sesame protein and the other oil seed vegetable proteins. It is preferable that the protein material have at least about 50 percent by weight protein therein. In other words, the protein material should be concentrated so that it comprises a major portion of protein.

The aqueous slurry is prepared simply by adding the proteinaceous material to water and mixing until a slurry is provided. Preferably the slurry is prepared by mixing from 3–16 percent by weight of the proteinaceous material in water and mixing until slurry has occurred. This preferably gives an overall protein content in the slurry of up to about 12 percent by weight.

The next step in the invention requires adjusting the pH of the aqueous slurry to a pH of from above 7.0 to about 10.5 by addition thereto of an alkali metal carbonate. It is important and critical to the invention that the aqueous slurry have a pH above 7.0 in order to carry out the complete process of this invention. This can generally be accomplished by adding from about ½ to 4 percent by weight of the alkali metal carbonate. By use herein of the term "alkali metal carbonate" it is intended to mean the term with its well known use consisting of the carbonates of the alkali metals as well as the bicarbonates or acid carbonates thereof. For instance, sodium carbonate and potassium carbonate are highly acceptable in this invention as well as sodium bicarbonate and potassium bicarbonate. It is within the purview of one well skilled in the art that he might achieve the desired pH range by addition of the carbonate. It is preferable that the pH be adjusted between 7.2 and 10.5 and a pH of about 8 is highly preferable. After the pH has been adjusted by addition of an alkali metal carbonate the aqueous slurry is heated to react the alkali metal carbonate with the protein. The heating must be sufficient to provide a reaction between the carbonate and the protein but must be below the decomposition temperature of the protein. We have found, for instance, that the 330°F. reaction temperature is an enclosed vessel for a time period of from 160–200 seconds produces an acceptable product. We have also found that a temperature of from 295°F. to 310°F. for from 3½ to 5 minutes produces a good product. Other times and temperatures may also be utilized providing the reaction product, when neutralized, has the same properties as are herein attributed to the above-described reaction. It is well within the skill of one knowledgeable in the art to prepare these different products with different reactions in order to arrive at an end product. However, the optimum conditions are as stated above. In any condition, the temperature should be at least about the boiling point of water up to a point at which degradation of the protein material or reaction product occurs. It is preferably that the reaction be conducted in a closed vessel since this enables heating of the aqueous slurry above the boiling point of water. Generally this will raise the pressure of the reaction to something around 90 lbs. per square inch but this is acceptable in producing a desirable product.

At this point in the process, it is preferable to cool the reacted mass. This can be accomplished by conventional means to arrive at a temperature of from about room temperature to 130°F.

The next step in this invention requires the neutralizing of the slurry to a pH of from 6.6 to 7.0 by addition thereto of an edible acid. It is critical that the neutralization produce a neutralized pH within the stated range. A much lower pH will not enable precipitation of the protein. For instance, a pH of 5.0 does not allow for precipitation. And, likewise, a pH of 7.2 does not allow for precipitation of the protein. The neutralization can occur by use of any of the known edible acids which are normally used as food additives. For instance, hydrochloric acid, citric acid, formic acid, and acetic acid, are all members of the group of edible food grade acids acceptable for use in this invention.

After the slurry has been neutralized it is then dried to remove a substantial portion of the water. The moisture content of the final product should be about 15 percent by weight moisture or lower. Drying can occur in any of the common commercial processes such as drum drying, spray drying, or freeze drying, and either process is acceptable for use in this invention.

DESCRIPTION OF THE PREFERRED EMBODIMENTS

This invention may be more fully described but is not limited by the following examples.

EXAMPLE 1

An aqueous slurry of 8 percent by weight soy protein isolate was prepared by mixing the soy protein isolate in water in the appropriate proportion. Sodium carbonate was added to the mixture until the pH was 8.0. The mixture was then heated to a temperature of 300°F. in a closed vessel for about 4 minutes. After heating, the product was cooled to 120°F. and then neutralized by addition thereto of hydrochloric acid until the pH was 6.8. The product was then dried on a drum drier until the moisture content thereof was about 10 percent by weight. The product was admixed with 25–30 percent by weight protein to product, when extruded, a fibrous product in which the modified protein acted as a substitute for sodium caseinate.

EXAMPLE 2

Example 1 was repeated with the exception that the alkali metal carbonate was potassium carbonate. Again, an acceptable product was produced.

EXAMPLE 3

Example 1 was repeated except the vegetable protein material was oat protein. Again, an acceptable product was produced.

EXAMPLE 4

Example 2 was repeated with the exception that the vegetable protein material was oat protein. Again, an acceptable product was produced.

EXAMPLE 5

Example 1 was repeated except the vegetable protein material was a mixture of 1 part by weight oat protein and 2 parts by weight soy protein concentrate. Again, an acceptable sodium caseinate replacement was produced.

EXAMPLE 6

Example 1 was repeated except the vegetable protein material was a mixture of 1 part by weight sesame protein and 3 parts by weight soy protein concentrate. Again, an acceptable sodium caseinate replacement was produced.

EXAMPLE 7

Example 1 was repeated except the vegetable protein material was a mixture of 1 part by weight peanut protein and 1 part by weight soy protein concentrate. Again, an acceptable sodium caseinate replacement was produced.

EXAMPLE 8

Example 2 was repeated except the vegetable protein material was a mixture of 1 part by weight sasame protein and 3 parts by weight soy protein concentrate. Again, an acceptable sodium caseinate replacement was produced.

EXAMPLE 9

Example 2 was repeated except the vegetable protein material was a mixture of 1 part by weight peanut protein and 3 parts by weight soy protein concentrate. Again, an acceptable sodium caseinate replacement was produced.

It may be seen that this invention provides a new and novel method for imparting thermoplastic properties to vegetable proteins. The new modified protein has thermal reversibility and the flow properties, gelling properties, and fiber forming ability of caseinate containing products. The modified protein is found to be a highly acceptable substitute for sodium caseinate and casein in food products.

Having fully described this new and unique invention we claim:

1. A process for producing a modified vegetable protein having thermoplastic and forming properties similar to casein and caseinate salts, said process comprising:
    A. making an aqueous slurry of a vegetable protein material containing at least about 50 percent by weight protein selected form the group consisting of oat protein and oil seed vegetable protein, said slurry having a solids content of from about 3 percent to about 16 percent by weight;
    B. adjusting the pH of the aqueous slurry to a pH of from above 7.0 to about 10.5 by addition thereto of an alkali metal carbonate;
    C. heating the aqueous slurry to a temperature of from 280°F. to 370°F. for from 2½ to 5 minutes to react the alkali metal carbonate with the protein;
    D. neutralizing the slurry to a pH of from 6.6 to 7.0 by addition thereto of an edible acid; and
    E. drying the neutralized slurry to remove a substantial portion of the water therein.

2. A process as in claim 1 wherein the protein material is a solvent extracted oil seed vegetable protein.

3. A process as in claim 1 wherein the aqueous slurry has a protein content of up to about 12 percent by weight.

4. A process as in claim 1 wherein the alkali metal carbonate is a member selected from the group consisting of sodium carbonate, sodium bicarbonate, potassium carbonate, and potassium bicarbonate.

5. A process as in claim 1 wherein the heating step comprises heating the mixture to a temperature of from 295°F. to 310°F. in a closed vessel for from 3½ to 5 minutes.

6. A process as in claim 1 wherein the vegetable protein material is soy protein isolate.

7. A process as in claim 1 wherein the vegetable protein material is oat protein.

8. A process for producing a modified vegetable protein having thermoplastic and forming properties similar to casein and caseinate salts, said process comprising:
  A. making an aqueous slurry of a vegetable protein material containing at least about 50 percent by weight protein selected from the group consisting of oat protein and oil seed vegetable protein, said slurry having a solids content of from about 3 percent to about 16 percent by weight;
  B. adjusting the pH of the aqueous slurry to a pH of from above 7.0 to about 10.5 by addition thereto of an alkali metal carbonate;
  C. heating the aqueous slurry to a temperature of from 280°F. to 370°F. for from 2½ to 5 minutes to react the alkali metal carbonate with the protein;
  D. cooling the reacted protein slurry to a temperature below about 130°F.;
  E. neutralizing the slurry to a pH of from 6.6 to 7.0 by addition thereto of an edible acid; and
  F. drying the neutralized slurry to remove a substantial portion of the water therein.

* * * * *